Feb. 17, 1959   A. KIRCHER, JR., ET AL   2,874,054
METHOD OF MAKING SAUSAGE EMULSIONS
Filed July 23, 1956   2 Sheets-Sheet 1

INVENTORS:
Albert Kircher Jr.
and Dewey A. Manion Jr.
BY Blair, Freeman & Molinare
ATTORNEYS.

Feb. 17, 1959   A. KIRCHER, JR., ET AL   2,874,054
METHOD OF MAKING SAUSAGE EMULSIONS
Filed July 23, 1956   2 Sheets-Sheet 2
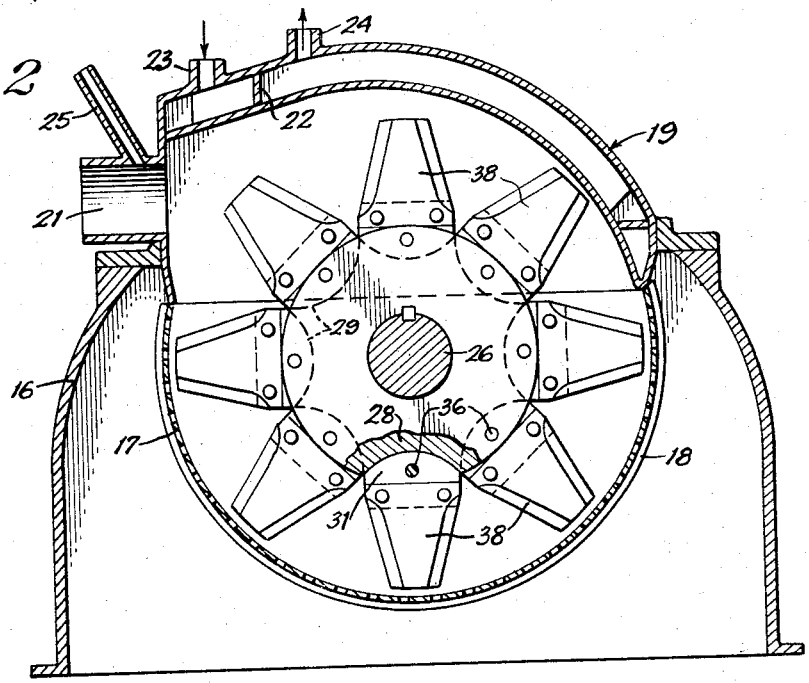
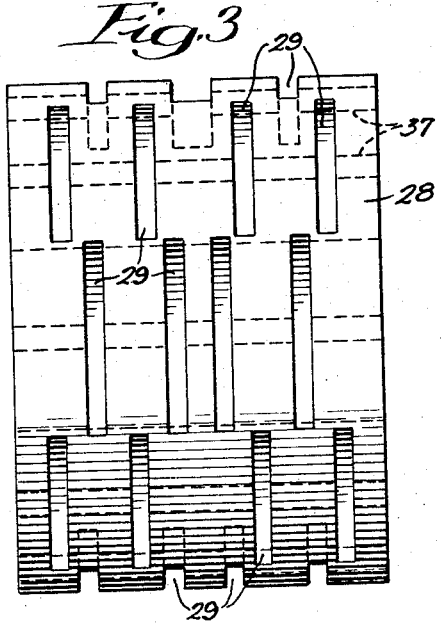
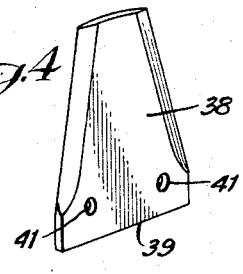
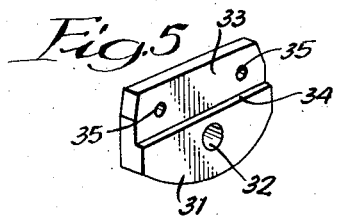
INVENTORS:
Albert Kircher Jr.
and Dewey A. Manion Jr.
BY Arix Freeman & Molinare
ATTORNEYS.

United States Patent Office 2,874,054
Patented Feb. 17, 1959

2,874,054

METHOD OF MAKING SAUSAGE EMULSIONS

Albert Kircher, Jr., Downers Grove, and Dewey A. Manion, Jr., Chicago, Ill., assignors to The W. J. Fitzpatrick Company, Chicago, Ill., a corporation of Illinois Application July 23, 1956, Serial No. 599,374

2 Claims. (Cl. 99—109)

This invention relates to a method of and apparatus for marking sausage emulsions, and more particularly to the conversion of meat material, including chunks of meat, into emulsions for the preparation of meat loaves, frankfurters, sausages and the like.

Heretofore the making of sausage emulsions has been a batch process by which the meat material is chopped in batches to the desired degree of fineness for the particular product being prepared. The common practice has been to place the meat material in a bowl and chop it by reciprocating chopper blades while rotating the bowl. In this process the fineness of the product cannot be controlled accurately, and complete uniformity cannot be obtained, with the result that the final product constitutes a mixture of undersized and oversized particles.

In the conventional process the material has been kept cool during chopping by the addition of ice thereto. The material is normally cool at the start of the process, usually from 30° to 38° F., but tends to increase in temperature during chopping. Thus the ice added to the material melts during the process and may create excessive water content in the finished material. It is also very difficult to maintain the desired maximum temperature in this manner.

Another problem encountered in making sausage emulsions is so-called fat capping or fatting out. This results from separation of the fat in the chopped product so that the fat rises to the top or tends to migrate to the outside of the chopped material to product an unsightly product and with a loss of the fat content.

It is accordingly one of the principal objects of the present invention to provide a method of and apparatus for making sausage emulsions by which an extremely uniform sausage emulsion is produced in a continuous process with adequate cooling without dilution and with adequate emulsification to eliminate fat capping or fatting out.

Another object is to provide a method and apparatus in which the meat product is cut in a chamber by passing knives therethrough at high speed on the order of 120 feet per second.

According to a feature of the invention, the product is passed continuously through a chamber closed in part by a screen and by driving a rotor in the chamber which carries a plurality of knives to cut the material to a size to pass through the screen. The rotor includes a hub whose diameter is approximately one-half the diameter of the chamber and relatively short flat blades secured to the hub and lying in planes normal to the axis of rotation.

Still another object is to provide a method and apparatus in which the material is chopped in the presence of an inert gas such as hydrogen or nitrogen to minimize discoloration of the material and to improve the shelf life.

A further object is to provide a method and apparatus in which the material is cooled by jacketing at least a portion of the wall of the chamber so that there is no dilution of the material, and accurate control of the temperature can be maintained.

A still further object is to provide an apparatus for making sausage emulsions in which the knives are detachably supported by the rotor for easy removal and replacement.

The above and other objects and advantages of the invention will be more readily apparent from the following description when read in connection with the accompanying drawings in which:

Figure 2 is a partial section on the line 2—2 of Figure 1;

Figure 3 is a side elevation of the rotor;

Figure 4 is a perspective view of one of the cutting blades; and

Figure 5 is a perspective view of a blade supporting plate.

Figure 1:
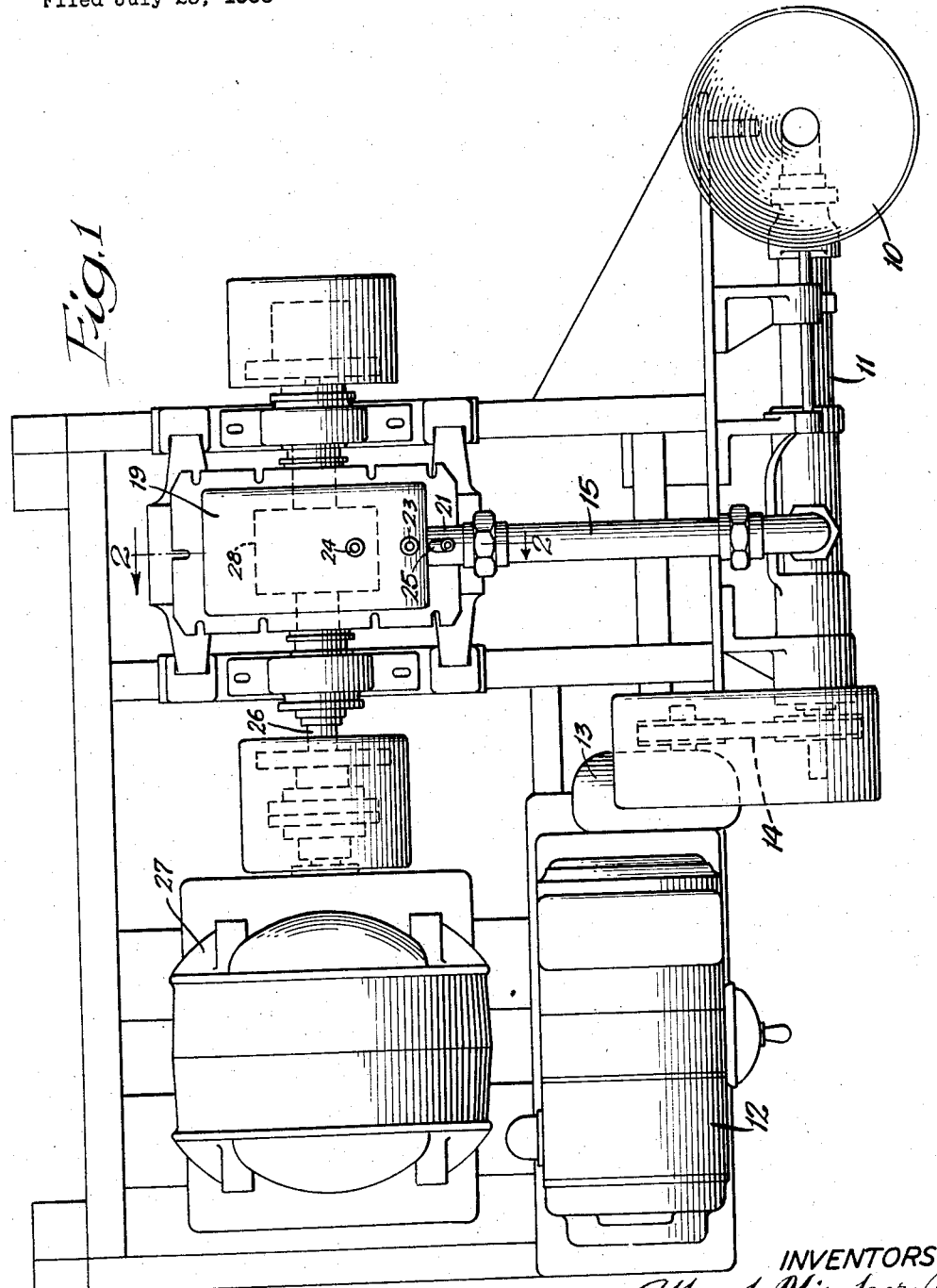
Figure 1 is a plan view of an apparatus embodying the invention.

The complete apparatus as illustrated in Figure 1 comprises a hopper 10 into which the material to be processed may be placed and from which the material flows to a pump 11. The pump 11 is preferably the type having a rotating helical rod element turning in a casing having a double helical groove therein, and which is capable of pumping relatively large chunks or pieces of material, such as meat, without damaging the material or clogging the pump. The pump is driven by a motor 12 through a speed reducer 13 and drive belt 14 to force the material from the hopper through a feed tube 15 into the emulsifying apparatus.

The emulsifying apparatus comprises a mill as best seen in Figure 2, having a main body 16 closed in its lower portion by an arcuate screen 17. The screen is preferably supported by inserting its edges in grooves formed in the sides of the body by projecting strips 18 so that the screen can easily be removed for cleaning or for substitution of a different screen having different sized openings. It will be understood that the size of the openings in the screen controls the size of the particles in the final emulsion, so that by utilizing different screens, different types of emulsion can be produced for different products.

The top of the casing is closed by a removable cover indicated generally at 19, which fits over the top of the body 16, as shown in Figure 2. The cover 19 has a curved inner surface forming a continuation of the arcuate screen 17, and is provided at one side with a nipple 21 for connection to the feed tube 15.

According to one feature of the invention, the cover is jacketed so that cooling fluid can be circulated therethrough to cool the material during emulsification thereof. As shown, the cover 19 is made hollow and is provided with partitions 22 dividing it into flow passages for cooling fluid. An inlet connection 23 communicates with one end of the passages formed by the partitions 22, and an outlet connection 24 communicates with the opposite end of the passages for discharge of the cooling fluid. In operation a continuous flow of cooling fluid through the cover is maintained and may be thermostatically controlled so that the temperature of the material in the chamber is accurately controlled at all times.

According to a further feature of the invention, a supply pipe 25 for an inert gas, such as hydrogen, nitrogen, carbon dioxide or the like, may be connected to the inlet connection 21. During processing inert gas may be continuously fed into the connection 25 to mix with the meat material entering the emulsifier chamber through the inlet connection 21, so that the material will be chopped and emulsified in an inert atmosphere. Use of inert gas in this manner eliminates discoloration of the product and has been found to improve the shelf life of the product substantially.

A rotor is mounted within the emulsifier chamber for chopping and emulsifying the meat product therein. As shown, the rotor comprises a shaft 26 extending through the chamber and connected to a driving motor 27 to be driven at high speed thereby. A hub 28 is secured to the shaft 26 within the chamber and has a generally cylindrical exterior whose diameter is approximately half the diameter of the chamber. This relationship is important to minimize variation between the root and tip speeds of the blades as described hereinafter, and to insure that all of the material passing through the chamber will be treated uniformly. The hub 28 is formed, as best seen in Figure 3, with a plurality of spaced arcuate grooves 29 in its periphery to receive and support blades. In the unit as shown there are 32 such grooves in spaced groups of four with the blades in the different groups overlapping each other circumferentially to insure that all of the product passing through the chamber will be engaged and cut uniformly.

To mount blades on the rotor mounting plates, as shown in Figure 5, are employed having relatively wide base portions 31 arcuately shaped at their lower edges and pierced at 32 for reception of a mounting rod. The outer portions of the mounting plates, as shown at 33, are narrower than the base portions to leave a shoulder 34 which will lie tangent to the rotor, and are pierced at 35 for the reception of mounting bolts for the blades. A mounting plate is inserted in each of the peripheral grooves 29 in the rotor and completely fills the groove with the mounting portion 33 projecting beyond the rotor surface. With the mounting plates in place fastening rods 36 are inserted through bores 37 in the rotor to pass through the openings 32 and secure the mounting plates to the rotor.

The mounting plates support blades 38 which may be formed, as best seen in Figure 4, with flat base portions 39 pierced as shown at 41. Beyond the base portions the blades taper outwardly and are sharpened at both edges so that they can be reversed to cut from either side. To mount the blades the flat bases 39 thereof are positioned against the shoulders 34 of the mounting plates, and bolts or similar fastenings are inserted through the openings 35 and 41 to secure the blades to the mounting plates. When mounted as shown in Figure 2, the tips of the blades have a small clearance from the inner surface of the chamber and screen.

In use of the apparatus chunks of meat or similar product to be emulsified are fed into the chamber through the inlet connection 21, and inert gas is preferably supplied simultaneously through the connection 25. The motor 27 turns at a relatively high speed on the order of 3600 R. P. M. and with a hub having a diameter of 8 inches will provide a minimum speed of the knives adjacent to the hub of about 120 feet per second. During the operation of the apparatus cooling liquid, such as cold water, is circulated through the jacketed cover 19 and is controlled to maintain a maximum temperature of the product not exceeding 60° F., and preferably in the range of 57° to 58° F. This temperature has been found to be optimum for making sausage emulsions, giving the maximum uniformity of product and maximum emulsification of the fat content.

As the rotor turns, material passing through the chamber will be engaged and cut by the knives 38 while suspended in the chamber. Due to the large number of knives and the high speed of travel thereof, an extremely uniform emulsion is obtained very rapidly. The product, when cut to the desired size, passes out through the screen 17 and may be taken directly to further processing apparatus for stuffing, cooking and the like, depending upon the particular product to be made. The high speed of the blades and the cutting of the product while suspended in the chamber results in a homogeneous mixture of all parts of the material, including fats, lean meat and other ingredients, so that the final emulsion is extremely stable, and fat capping or fatting out is eliminated.

While one embodiment of the invention has been shown and described in detail, and one particular process has been described in detail, it will be understood that these are illustrative only and are not to be taken as a definition of the scope of the invention, reference being had for this purpose to the appended claims.

What is claimed is:

1. The method of making sausage emulsions comprising passing cooled meat material continuously through a confined space, causing the material to be suspended in the space, cutting the material while suspended in the space at a lineal speed of at least 120 feet per second, and limiting the maximum size of particles leaving the space while cooling the material in the space.

2. The method of claim 1 in which the temperature of the material in the space is maintained in the range of from 57° F. to 58° F.

References Cited in the file of this patent
UNITED STATES PATENTS

| | | |
|---|---|---|
| 2,447,427 | Oftedahl | Aug. 17, 1948 |
| 2,582,475 | Braunwalder et al. | Jan. 15, 1952 |
| 2,617,460 | Levit | Nov. 11, 1952 |
| 2,681,279 | Sloan et al. | June 15, 1954 |